(12) United States Patent
Ogden et al.

(10) Patent No.: US 10,663,282 B1
(45) Date of Patent: May 26, 2020

(54) FIBER-COUPLED PHASED ARRAY OF PHOTONIC INTEGRATED CIRCUIT IMAGERS

(71) Applicant: LOCKHEED MARTIN CORPORATION, Bethesda, MD (US)

(72) Inventors: Chad Elliott Ogden, Half Moon Bay, CA (US); Guy Chriqui, San Mateo, CA (US); Gregory Samuel Feller, Kentfield, CA (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 42 days.

(21) Appl. No.: 16/215,464

(22) Filed: Dec. 10, 2018

Related U.S. Application Data

(60) Provisional application No. 62/694,411, filed on Jul. 5, 2018.

(51) Int. Cl.
*G01B 9/02* (2006.01)
*G02B 6/30* (2006.01)

(52) U.S. Cl.
CPC ..... *G01B 9/02076* (2013.01); *G01B 9/02072* (2013.04); *G02B 6/30* (2013.01)

(58) Field of Classification Search
CPC ........ G02B 23/26; G02B 6/08; G02B 6/4298; G02B 6/30; G02B 6/12; G01B 9/02051
See application file for complete search history.

(56) References Cited

U.S. PATENT DOCUMENTS

| | | | | |
|---|---|---|---|---|
| 9,754,985 | B1* | 9/2017 | Duncan | H01L 27/14627 |
| 9,804,027 | B2* | 10/2017 | Fish | G02B 6/12004 |
| 10,564,373 | B1* | 2/2020 | Ogden | H04N 5/2253 |
| 2016/0091368 | A1* | 3/2016 | Fish | G02B 6/12004 |
| | | | | 356/328 |

* cited by examiner

*Primary Examiner* — Jonathan M Hansen
(74) *Attorney, Agent, or Firm* — Morgan, Lewis & Bockius LLP

(57) ABSTRACT

A fiber-coupled phased-array includes a first photonic integrated circuit (PIC) and a second PIC. The first PIC includes a first set of lenslets and waveguides. The second PIC includes a second set of lenslets and waveguides and is placed at a distance from the first PIC. The optical fibers couple the first PIC to the second PIC and form an interferometric imager that can sample spatial frequencies of a target. Optical delay errors induced by a relative placement of the first PIC and the second PIC are compensated for.

20 Claims, 6 Drawing Sheets

FIBER-COUPLED PHASED ARRAY OF PHOTONIC INTEGRATED CIRCUIT IMAGERS

CROSS-REFERENCE TO RELATED APPLICATIONS

This application claims the benefit of priority under 35 U.S.C. § 119 from U.S. Provisional Patent Application 62/694,411 filed Jul. 5, 2018, which is incorporated herein by reference in its entirety.

STATEMENT REGARDING FEDERALLY SPONSORED RESEARCH OR DEVELOPMENT

Not applicable

FIELD OF THE INVENTION

The present invention generally relates to photonic integrated circuits and more particularly, to fiber-coupled phased array of photonic integrated circuit imagers.

BACKGROUND

Segmented planar imaging detector for electro-optical reconnaissance (SPIDER) is an imaging system formed with waveguide arrays and other components needed to combine light rays from separate optical collectors, such as telescopes or lenslets. The SPIDER can achieve the performance capability needed by a number of space missions in a radically compressed and low-mass and/or -power package. The SPIDER has been used in a number of imaging systems such as heterodyne imaging systems, which leverages the SPIDER concept to develop photonics-enabled heterodyne electro-optical phased array (HEOPA). The spatial resolution of the SPIDER can be increased if the size limitations of the photonic integrated circuits (PICs) are overcome.

SUMMARY

According to various aspects of the subject technology, methods and configuration are disclosed for improving spatial-resolution limit of a photonic integrated circuit (PIC) interferometric imager. The subject technology improves spatial resolution limit of the PIC by increasing the maximum possible baseline length between two lenslets beyond the manufacturable size of a single PIC wafer. The current baseline length is restricted by the state-of-the-art wafer manufacturing that is limited to 300 mm diameter wafers (i.e. 300 mm baseline). The subject technology allows coupling multiple PICs using optical fibers to form a planar imager with significantly larger baseline length depending on the number of coupled PICs.

In one or more aspects, a fiber-coupled phased array includes a first PIC and a second PIC. The first PIC includes a first set of lenslets and waveguides. The second PIC includes a second set of lenslets and waveguides and is placed at a distance from the first PIC. The optical fibers couple the first PIC to the second PIC and form an interferometric imager that can sample spatial frequencies of a target. Optical delay errors induced by a relative placement of the first PIC and the second PIC are compensated for.

In yet other aspects, a multi-PIC interferometric phased array includes a plurality of PICs placed at a distance from one another and coupled to one another using optical fibers and an optical meteorology circuit. The optical meteorology system can measure optical delay errors induced by relative placement of the plurality of PICs. A combination of the PICs includes groups of lenslet pairs and corresponding coupling waveguides and forms an interferometric imager. The interferometric imager can sample spatial frequencies of a target with a high spatial-frequency resolution defined by a separation between a lenslet pair having a largest distance across the plurality of PICs.

In yet other aspects, a method of providing an interferometric phased array includes coupling a number of PICs together by using optical fibers, the plurality of PICs being placed at a distance from one another. An optical meteorology system measures optical delay errors induced by relative placement of the plurality of PICs. An interferometric imager formed by a combination of the PICs can sample spatial frequencies of a target with a spatial-frequency resolution. The spatial-frequency resolution is defined by a separation between a lenslet pair having a largest distance across the plurality of PICs.

The foregoing has outlined rather broadly the features of the present disclosure in order that the detailed description that follows can be better understood. Additional features and advantages of the disclosure will be described hereinafter that form the subject of the claims.

BRIEF DESCRIPTION OF THE DRAWINGS

For a more complete understanding of the present disclosure and the advantages thereof, reference is now made to the following descriptions to be taken in conjunction with the accompanying drawings describing specific aspects of the disclosure, wherein.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced by using one or more implementations. In one or more instances, well-known structures and components are shown in block-diagram form in order to avoid obscuring the concepts of the subject technology.

In some aspects of the present technology, methods and configurations are described for improving spatial-resolution limit of a photonic integrated circuit (PIC) interferometric imager. In particular, the subject technology improves spatial-resolution limit of the PIC imager by increasing the maximum possible baseline length between two lenslets beyond the manufacturable size of a single PIC wafer. This disclosed solution leverages PIC imagers that sample spatial frequencies of a target. In order for a PIC imager to resolve an image, the imager has to sample a sufficiently broad distribution of spatial frequencies. Samples in the spatial frequency (e.g., in a U-V plane) can be made via pairs of lenslets of varying separation and orientation. The vector describing the separation and direction between the two lenslets is referred to as a baseline.

In some aspects, the light from lenslets on two separate PICs can be combined via an array of optical fibers connecting the two separate PICs. The PICs can be designed with sufficient internal optical delay to compensate for any delay errors induced by the relative placement of the PICs. In one or more aspects, the optical delay fluctuations induced by vibration or movement of the optical fibers can be measured via a laser metrology system incorporated into the PICs. In some aspects, the measured optical delay fluctuations can be compensated for by optical delays implemented in the PICs.

In one or more aspects, the laser metrology can be implemented in the same fibers that carry the imaging light. In other embodiments, the laser metrology can be implemented in adjacent fibers, for example, in the array interleaved with imaging fibers. Once any optical delay instability induced by the fibers is measured and compensated, then the maximum baseline of the device, and hence the imaging resolution limit, is restricted by the length of the fiber, which can be controlled, rather than by the size of a single PIC wafer, which is technology-dependent. Depending on the efficacy of the fiber compensation, this could increase the baseline limit by orders of magnitude.

Figure 1:
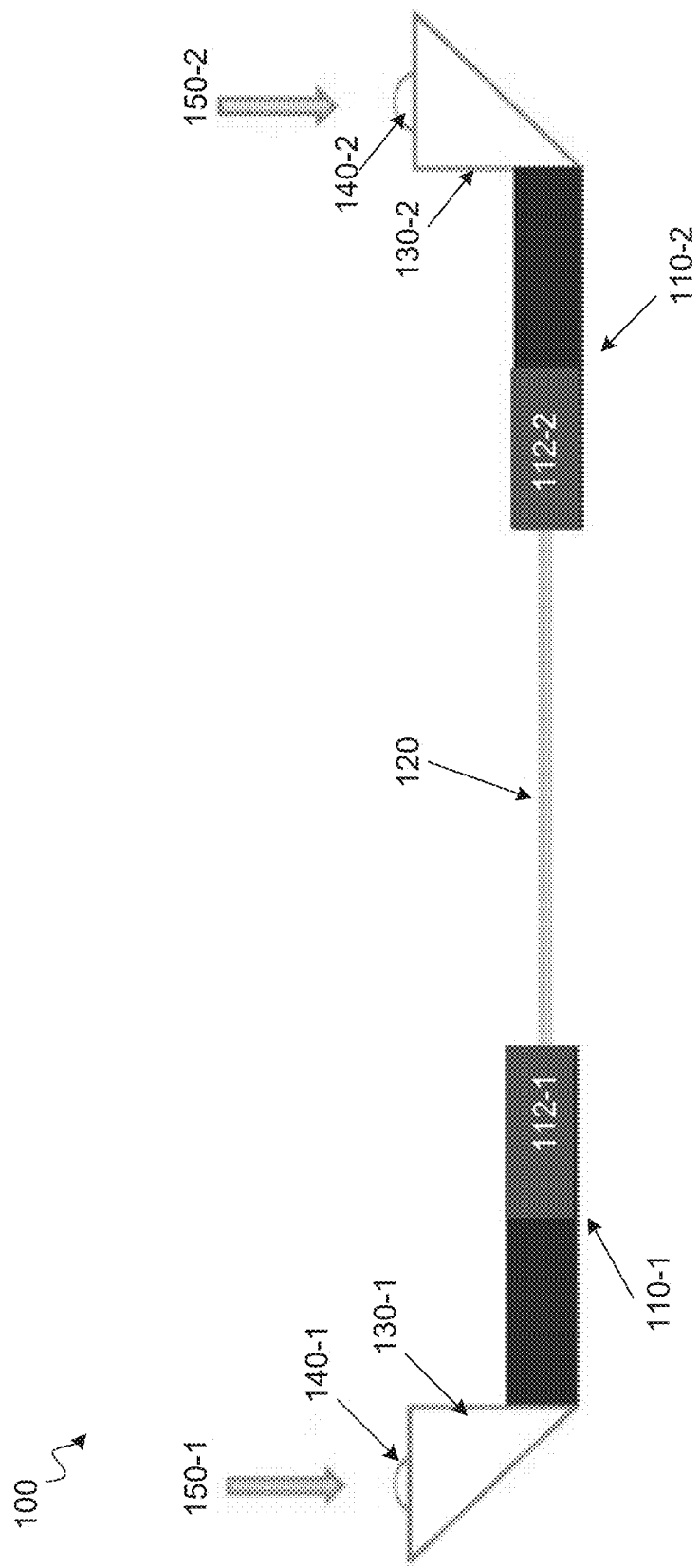
FIG. 1 is a conceptual diagram illustrating a side view of an example photonic integrated circuit (PIC) imager formed of two fiber-coupled PICs, according to certain aspects of the disclosure.

FIG. 1 is a conceptual diagram illustrating a side view of an example PIC imager 100 formed of two fiber-coupled PICs, according to certain aspects of the disclosure. PIC imager 100 depicted in the side view shown in FIG. 1 is an interferometric imager that can sample spatial frequencies of a target at a distance from PIC imager 100. PIC imager 100 includes PICs 110-1 and 110-2 coupled via an optical fiber 120. PICs 110-1 and 110-2 include a pair of lenslets formed of lenslets 140-1 and 140-2, respectively, which are attached to PICs 110-1 and 110-2 via 90-degree couplers 130-1 and 130-2 (also referred to as vertical couplers), respectively. Input light rays 150 (e.g., 150-1 and 150-2) are received from the target and are guided through 90-degree couplers 130-1 and 130-2 to respective waveguides implemented on PICs 110-1 and 110-2. The respective waveguides direct the input light rays 150 to an interferometric processor that can combine input light rays 150 from a number of pairs of lenslets with different baselines to generate interference fringes. It is also noted that optical fiber 120 is a fiber of a bunch of fibers forming an optical ribbon that couples PIC 110-1 to PIC-110-2.

The purpose of coupling PICs 110-1 and 110-2 via optical fibers (e.g., optical fiber 120) is to extend lengths of baselines to achieve baseline lengths that are larger than a dimension (e.g., diameter) of a PIC wafer. The increase in baseline length, particularly, the largest baseline can result in improving the spatial resolution of the PIC imager. In other words, the spatial resolution of PIC imager 100 can be significantly higher than the spatial resolution of an imager formed of PIC 110-1 or PIC 110-2.

FIG. 1 depicts only one pair of lenslets of a large number of lenslet pairs that can be implemented on a PIC imager such as PIC imager 100. An interferometric imager such as PIC imager 100 can combine a first set of lenslets and waveguides of PIC 110-1, a second set of lenslets and waveguides of PIC 110-2 and a number of optical fibers (e.g., 120) to sample the spatial frequencies of the target with a spatial resolution higher than a spatial resolution associated with each of PIC 110-1 and PIC 110-2, respectively. Each pair of lenslets provides a baseline with a length that depends on the separation distance between the respective lenslets. The PICs 110-1 and 110-2 further include meteorology systems 112 (e.g., 112-1 and 112-2) conceptually shown in FIG. 1, as implemented on the PICs 110-1 and 110-2. The meteorology system 112 can measure optical paths between lenslet pairs so that PIC imager 100 can compensate for the optical delay errors induced by a relative placement of PIC 110-1 and PIC 110-2, as discussed in more detail herein.

Figure 2:
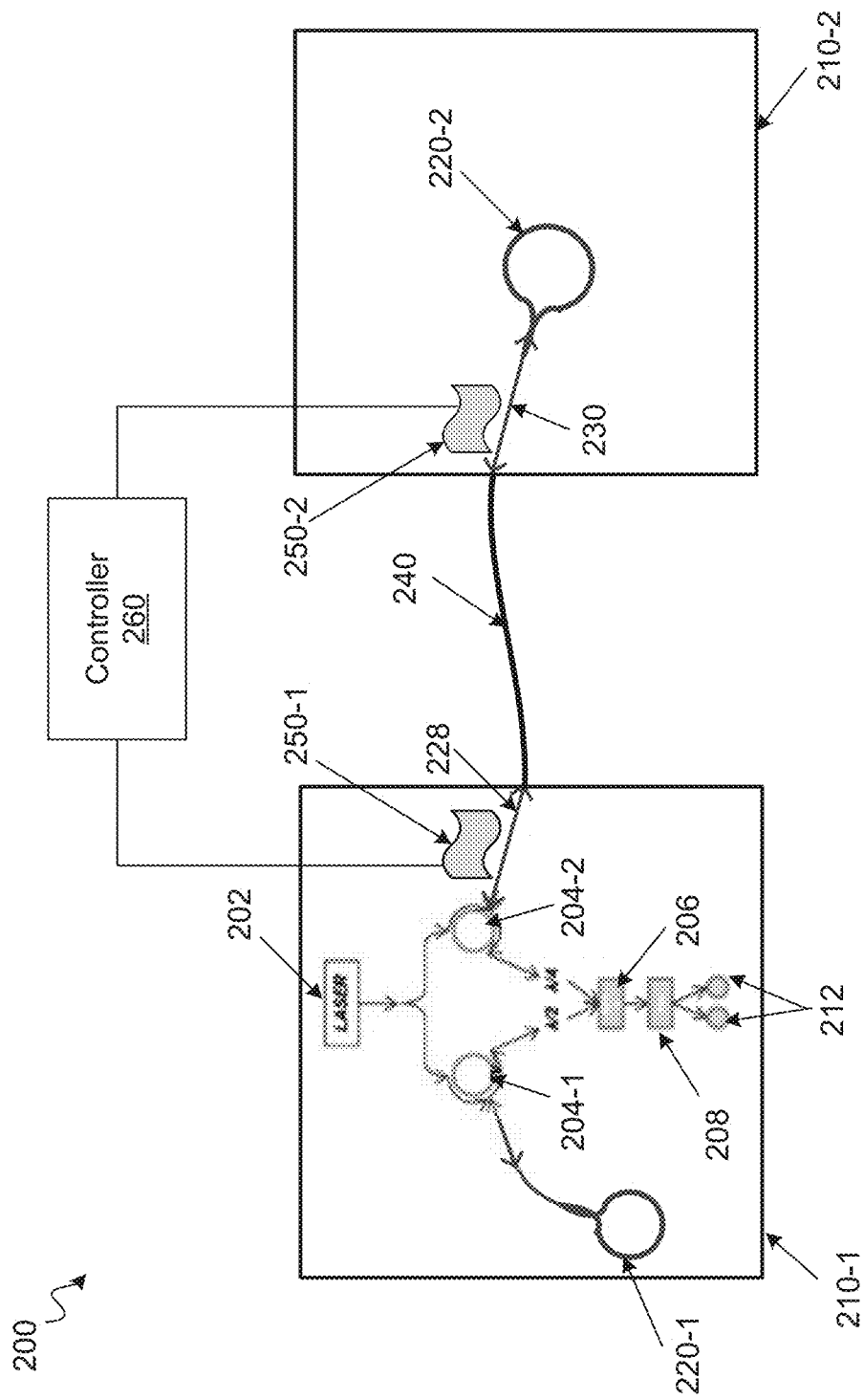
FIG. 2 is a conceptual diagram illustrating an example meteorology system of a PIC imager formed of two fiber-coupled PICs, according to certain aspects of the disclosure.

FIG. 2 is a conceptual diagram illustrating an example metrology system 200 of a PIC imager formed of two fiber-coupled PICs, according to certain aspects of the disclosure. The Example meteorology system 200 is implemented on a PIC imager formed of a PIC 210-1 and a PIC-210-2. The meteorology system 200 includes a laser source 202, circulators 204 (e.g., 204-1 and 204-2), a combiner 206, a quadrature separator 208, detectors 212, reflectors 220 (e.g., 220-1 implemented on PIC 210-1 and 220-2 implemented on PIC-210-2), and fiber ribbon 240.

The light from the laser source 202 is directed to circulators 204. At circulators 204-1, a first portion of the laser light is directed to reflector 220-1, which after reflection in reflector 220-1 and return to circulator 204-1 is sent to the combiner 206. At circulators 204-2, a second portion of the laser light is directed, through the fiber ribbon 240, to reflector 220-2 of PIC 210-2. The reflected light from reflector 220-2 returns to circulator 204-2 to be sent to the combiner 206. At combiner 206, the reflected lights from reflectors 220 are combined and sent to quadrature separator 208 and eventually to detectors 212 for conversion to quadrature electrical signals. The quadrature electrical signals of the detectors 212 can be used by a processor such as a controller 260 to compensate for the optical delay errors induced by a relative placement of PIC 210-1 and PIC 210-2.

In some implementations, as is shown in FIG. 2, fiber ribbon 240 is coupled to waveguides 228 and 230 that are connected to circulator 204-1 and reflector 220-2, respectively. In one or more implementations, the heaters 250-1 and 250-2 can be resistive heaters that can increase temperature of portions of PICs 210-1 and 210-2 that are near the waveguides 228 and 230. In some implementations, the increase in temperature can change an optical path length between the reflectors 220, which in turn can compensate for the optical delay fluctuations of fiber ribbon 240, for example, induced by vibration or movement of fiber ribbon 240. Such optical delay can be measured by metrology system 200 and the compensation can be achieved by controller 260.

Figure 3B:
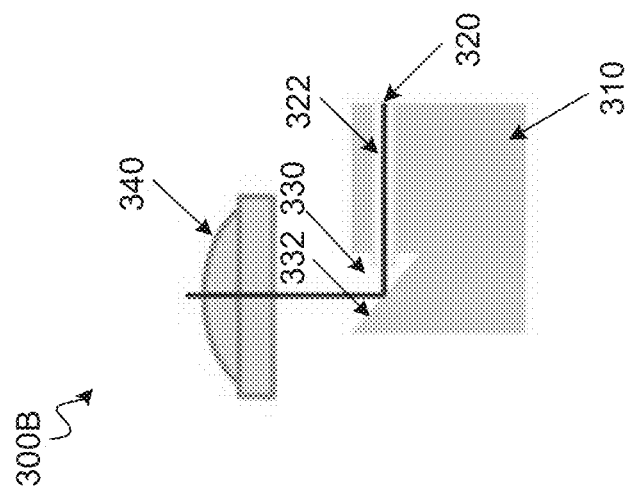
FIGS. 3A and 3B are schematic diagrams illustrating example structures of a segmented planar imaging detector for electro-optical reconnaissance (SPIDER) and a 90-degree lens-to-waveguide coupler.
Figure 3A:
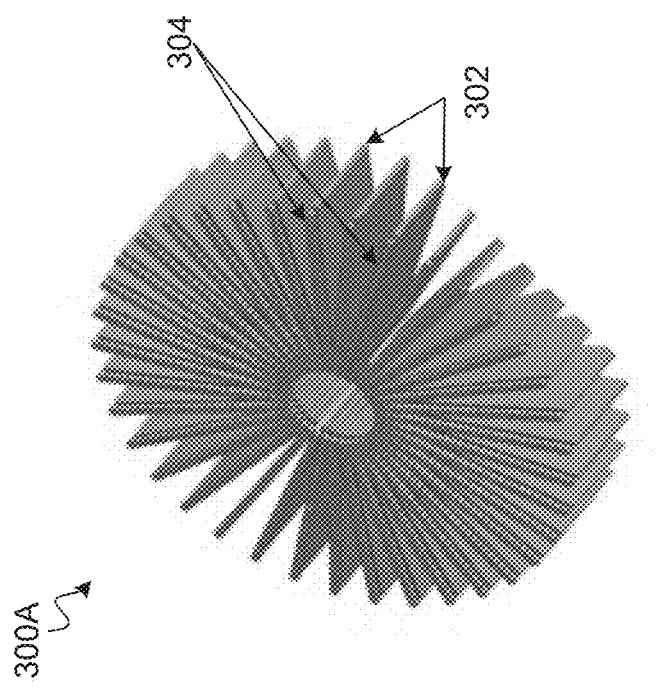

FIGS. 3A and 3B are schematic diagrams illustrating example structures of a segmented planar imaging detector for electro-optical reconnaissance (SPIDER) 300A and a vertical coupler 300B. SPIDER 300A shown in FIG. 3A is a multi-blade structure formed of a large number of blades 302. Each blade includes a sensor array implemented on a PIC. Each sensor array is an interferometric imaging device including a number of waveguide arrays. Each blade 304 includes a lenslet array consisting of a large number of lenslets arranged in a linear array and coupled to an edge of blade 302. Each lenslet concentrates light rays to a number of waveguides of a waveguide array. More detail discussion of the SPIDER can be found in the U.S. Pat. No. 8,913,859 B1, which is incorporated by reference herein.

Vertical coupler 300B shown in FIG. 3B is a 90-degree lenslet-to-waveguide coupler and includes a substrate 310 and an optical element (e.g., a lenslet) 340. Substrate 310 includes a waveguide 320 and a coupler 330 created by an etch process within substrate 310. Coupler 330 includes a 45-degree angled reflector 332 in front of the waveguide 320 and can redirect a light ray 322 traveling through waveguide 320 to optical element 340. Optical element 340 is placed in a plane parallel to the plane of the substrate 310, and an axis of optical element 340 is perpendicular to the plane of substrate 310. Reflector 332 can bend light ray 322 to enter along the axis of optical element 340. The vertical coupler 300B allows placing the lenslets of the SPIDER on the plane of blades 304. The subject technology allows to combine blades 304 (e.g., PICs) in a planar configuration and place the lenslet arrays on the PICs by using vertical coupling, as discussed herein. The vertical coupling is not limited to the vertical coupler 300 that is a 90-degree coupler etched inside a substrate of the PICs, and may include one of a 45-degree wedge coupler, a 3-D waveguide or a grating coupler.

Figure 4:
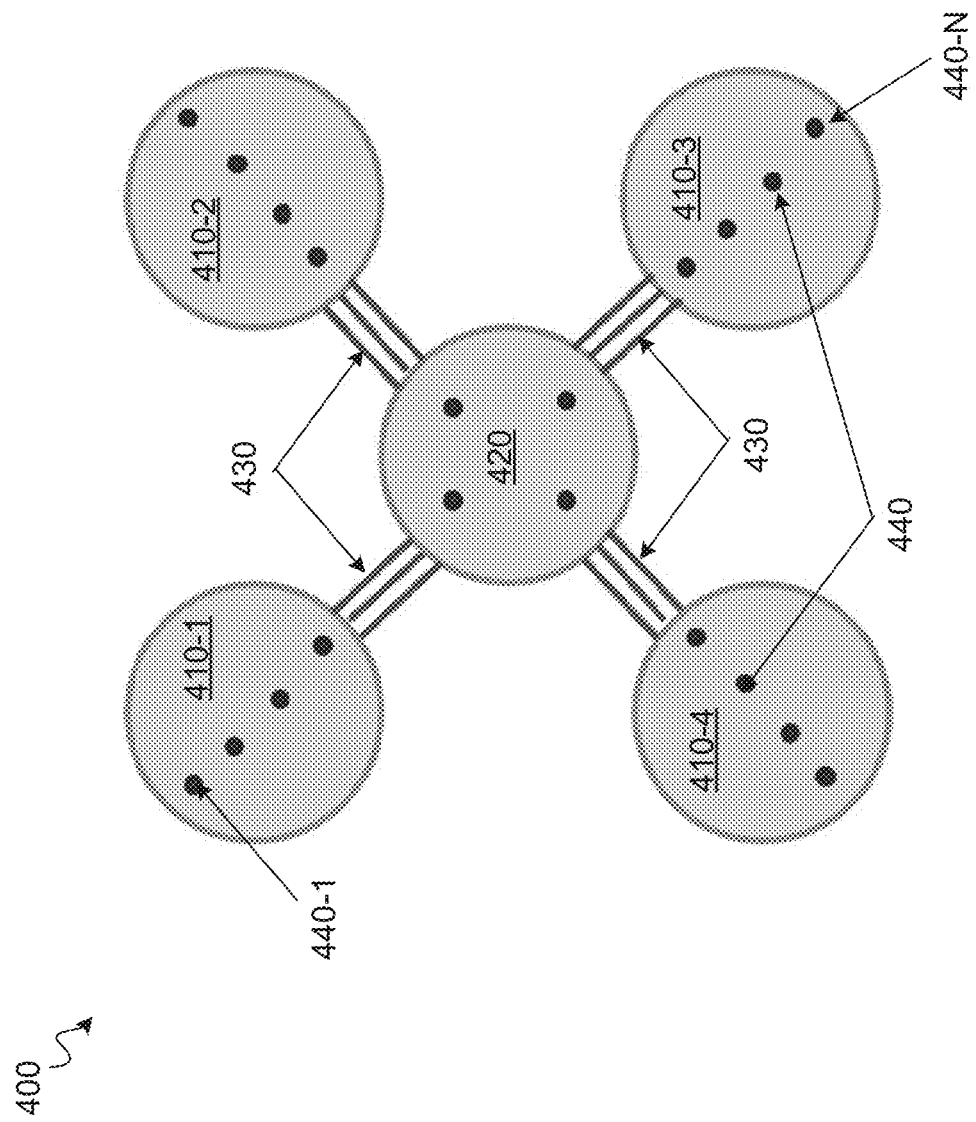
FIG. 4 is a conceptual diagram illustrating an example of a multi-PIC imager with fiber-coupled PICs, according to certain aspects of the disclosure.

FIG. 4 is a conceptual diagram illustrating an example of a multi-PIC imager 400 with fiber-coupled PICs, according to certain aspects of the disclosure. The example multi-PIC imager 400 of FIG. 4 shows only five PICs 410 of a larger number of PICs that can be combined to form a multi-PIC imager of the subject technology. PICs 410 (e.g., 410-1, 410-2, 410-3 and 410-4) are coupled to a central PIC 420 via fiber ribbons 430. PICs 410 and central PIC 420 include arrays of optical elements (e.g., lenslets) 440, of which only a limited number are shown in FIG. 4, for simplicity. The largest baseline length of each PIC (e.g., 410 or 420) is limited by the size of the wafer (e.g., semiconductor wafer) on which the PIC is fabricated, which is currently about 300 mm. The subject technology allows for expanding the baseline length of a PIC imager by coupling, in a planar configuration, multiple PICs by using fiber ribbons 430. It is understood that a multi-PIC imager is not limited to the configuration shown in FIG. 4, and the PICs of a multi-PIC imager can be arranged in different configurations, for example, hexagonal, circular or other configurations as suited to the application.

The expanded baseline length for such a fiber-coupled PIC imager is no longer limited by the wafer size of individual wafers used for fabricating the PICs. For example, the largest baseline length for multi-PIC imager 400, which is defined by the distance between lenslets 440-1 and 440-N, can be significantly larger than three times the largest baseline length of each PIC (e.g., 410 and 420). This is because the length of the coupling fiber ribbons 430 also contributes to the optical path length between two lenslets with longest distance across the entire multi-PIC imager 400. For example, for multi-PIC imager 400, the largest baseline is larger than the diameters of PICs 410-1, 420 and 410-3 by the length of the fiber ribbons coupling PICs 410-1 and 410-3 to the PIC 420. Accordingly, multi-PIC imager 400 can sample spatial frequencies of a target with significantly higher spatial resolution by orders of magnitude.

As discussed above with respect to FIG. 2, one or more of the PICs 410 or 420 may include a meteorology system that is controlled by a controller (e.g., 260 of FIG. 2). The meteorology system can measure optical delay errors induced by a relative placement of PICs, such as PICs 410-1 and 410-3 to the PIC 420. The measured optical delay errors can be compensated by delays implemented on the PICs 410 and/or 420, for example, by using heaters (e.g., 250 of FIG. 2) on the PICs 410 and 420, as discussed above. Once any optical delay instability induced by the fibers is measured and compensated, then the maximum baseline of the PIC imager, and hence the imaging resolution limit, is restricted by the length of the fiber ribbons, which can be controlled, rather than by the size of a single PIC wafer, which is technology-dependent.

Figure 5:
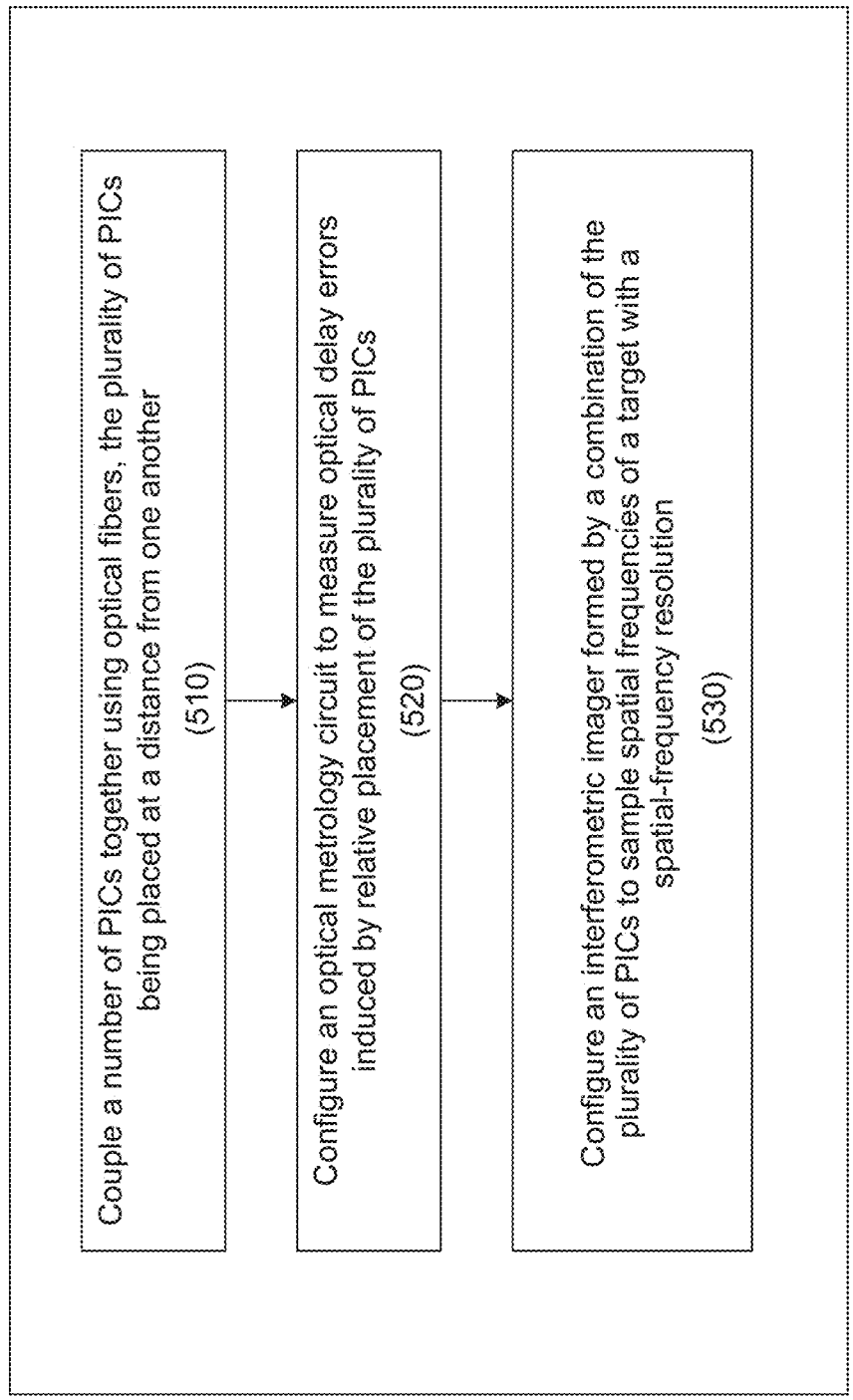
FIG. 5 is a flow diagram illustrating an example method for providing a fiber-coupled PIC imager, according to certain aspects of the disclosure.

FIG. 5 is a flow diagram illustrating an example method 500 for providing a fiber-coupled PIC imager, according to certain aspects of the disclosure. The method 500 includes coupling a plurality of PICs (e.g., 410 and 420 of FIG. 4) together using optical fibers (e.g., 430 of FIG. 4), the plurality of PICs being placed at a distance from one another (510). The method 500 further includes configuring an optical meteorology system (e.g., 200 of FIG. 2) to measure optical delay errors induced by relative placement of the plurality of PICs (520). An interferometric imager formed by a combination of the plurality of PICs can sample spatial frequencies of a target with a spatial-frequency resolution (530). The spatial-frequency resolution may be defined by a separation between a lenslet pair (e.g., 140 of FIG. 1 or 440-1 and 440-N of FIG. 4) having a largest distance across multiple PICs.

Figure 6:
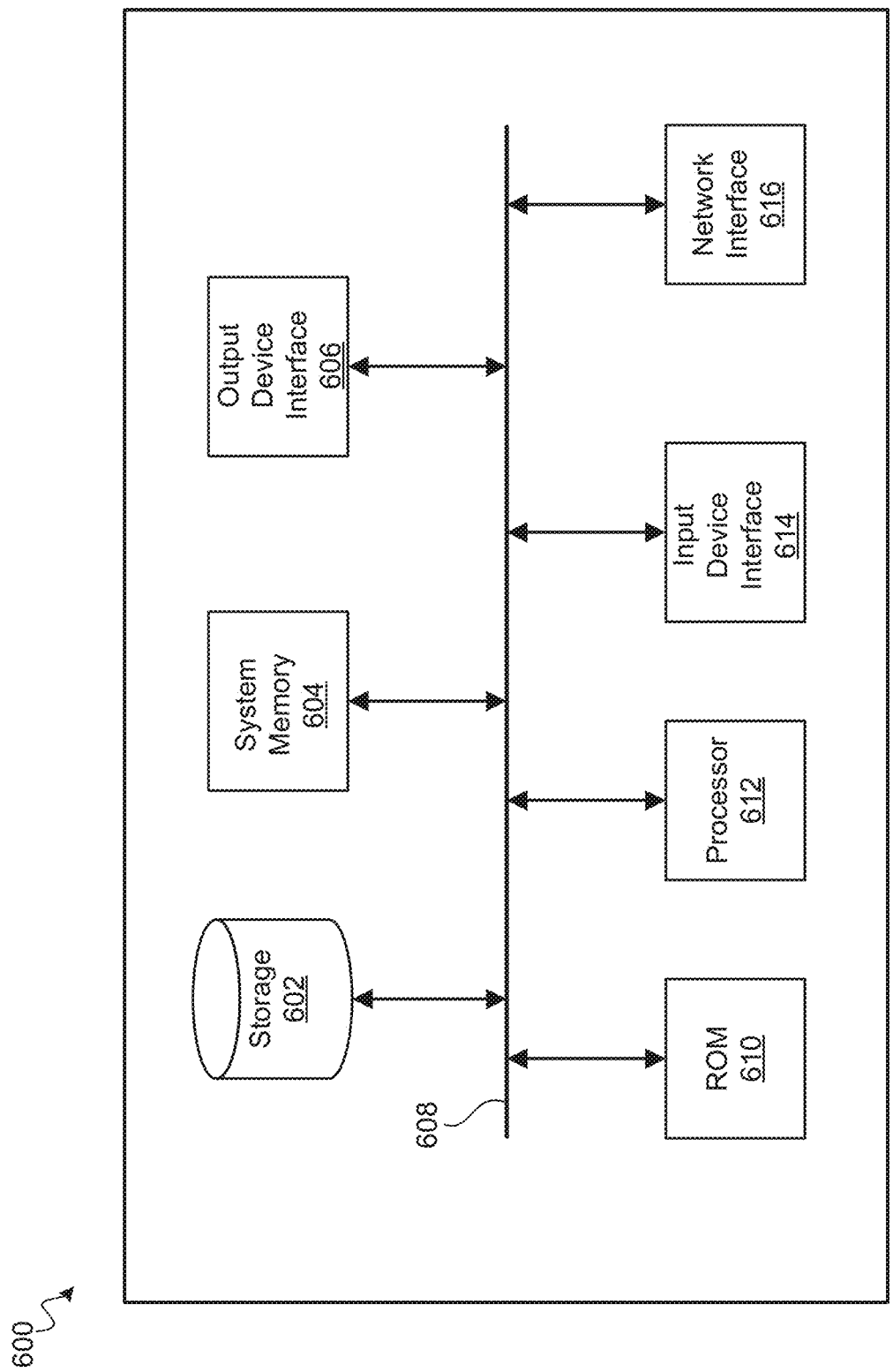
FIG. 6 conceptually illustrates an example electronic system with which some aspects of the subject technology are implemented.

FIG. 6 conceptually illustrates an example electronic system 600 with which some aspects of the subject technology are implemented. Electronic system 600, for example, can be a desktop computer, a laptop computer, a tablet computer, a server, a switch, a router, a base station, a receiver, or generally any electronic device that is capable of processing information. Such an electronic system may include various types of computer-readable media and interfaces for various other types of computer-readable media. Electronic system 600 includes bus 608, processing unit(s) 612, system memory 604, read-only memory (ROM) 610, permanent storage device 602, input device interface 614, output device interface 606, and network interface 616, or subsets and variations thereof.

Bus 608 collectively represents all system, peripheral, and chipset buses that communicatively connect the numerous internal devices of electronic system 600. In one or more implementations, bus 608 communicatively connects processing unit(s) 612 with ROM 610, system memory 604, and permanent storage device 602. From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. One or more implementations of the subject disclosure use a mass-storage device (such as a magnetic or optical disk and its corresponding disk drive) as permanent storage device 602.

Other implementations use a removable storage device (such as a floppy disk or a flash drive and its corresponding disk drive) as permanent storage device 602. Like permanent storage device 602, system memory 604 is a read-and-write memory device. However, unlike storage device 602, system memory 604 is a volatile read-and-write memory, such as random access memory. System memory 604 stores any of the instructions and data that processing unit(s) 612 needs at runtime. In one or more implementations, the processes of the subject disclosure are stored in system memory 604, permanent storage device 602, and/or ROM 610. From these various memory units, processing unit(s) 612 retrieves instructions to execute and data to process in order to execute the processes of one or more implementations. In some implementations, the processing unit(s) 612 may be employed to perform some of the processing tasks of the controller 260 of FIG. 2.

Bus 608 also connects to input and output device interfaces 614 and 606. Input device interface 614 enables a user to communicate information and select commands to the electronic system. Input devices used with input device interface 614 include, for example, alphanumeric keyboards and pointing devices (also called "cursor control devices"). Output device interface 606 enables, for example, the display of images generated by electronic system 600. Output devices used with output device interface 606 include, for example, printers and display devices such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 6, bus 608 also couples electronic system 600 to a network (not shown) through network interface 616. In this manner, the computer can be a part of a network of computers (such as a local area network ("LAN"), a wide area network ("WAN"), or an Intranet, or a network of networks, such as the Internet. Any or all components of electronic system 600 can be used in conjunction with the subject disclosure.

Many of the above-described features and applications may be implemented as software processes that are specified as a set of instructions recorded on a computer-readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer-readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. In one or more implementations, the computer-readable media does not include carrier waves and electronic signals passing wirelessly or over wired connections, or any other ephemeral signals. For example, the computer-readable media may be entirely restricted to tangible, physical objects that store information in a form that is readable by a computer. In one or more implementations, the computer-readable media is non-transitory computer-readable media, computer-readable storage media, or non-transitory computer-readable storage media.

In one or more implementations, a computer program product (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document) in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application-specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multi-tasking and parallel processing may be advantageous. Moreover, the separation of various system components in the embodiments described above should not be understood as requiring such separation in all embodiments, and it should be understood that the described program components and systems can generally be integrated together in a single hardware and software product or packaged into multiple hardware and software products.

As used in this specification and any claims of this application, the terms "base station", "receiver", "computer", "server", "processor", and "memory" all refer to electronic or other technological devices. These terms exclude people or groups of people. For the purposes of the specification, the term "display" or "displaying" means displaying on an electronic device.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. Underlined and/or italicized headings and sub-headings are used for convenience only, do not limit the subject technology, and are not referred to in connection with the interpretation of the description of the subject technology. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is:

1. A fiber-coupled phased-array comprising:
   a first photonic integrated circuit (PIC) including a first set of lenslets and waveguides;
   a second PIC including a second set of lenslets and waveguides and placed at a distance from the first PIC; and
   a plurality of optical fibers coupling the first PIC to the second PIC to form an interferometric imager configured to sample spatial frequencies of a target,
   wherein optical delay errors induced by a relative placement of the first PIC and the second PIC are compensated for.

2. The fiber-coupled phased-array of claim 1, wherein the interferometric imager is configured to combine the first set of lenslets and waveguides, the second set of lenslets and waveguides and the plurality of optical fibers to sample the spatial frequencies of the target with a spatial resolution higher than a first spatial resolution and a second spatial resolution associated with the first PIC and the second PIC, respectively.

3. The fiber-coupled phased-array of claim 2, further comprising a metrology system implemented by using a laser source and at least one of the plurality of optical fibers and configured to measure the optical delay errors induced by the relative placement of the first PIC and the second PIC.

4. The fiber-coupled phased-array of claim 3, wherein the metrology system is further configured to measure optical delay fluctuations induced by at least one of a movement or a vibration of an optical fiber of the plurality of optical fibers.

5. The fiber-coupled phased-array of claim 3, wherein the metrology system is implemented on one of the first PIC or the second PIC.

6. The fiber-coupled phased-array of claim 5, wherein at least one of the first PIC or the second PIC includes an adjustable optical delay that is configured to compensate for the optical delay errors induced by the relative placement of the first PIC and the second PIC.

7. The fiber-coupled phased-array of claim 6, wherein at least one of the first PIC or the second PIC includes a heating element configured to assist with delay-error compensation.

8. The fiber-coupled phased-array of claim 1, wherein the interferometric imager employs lenslet pairs of the first PIC and the second PIC coupled via waveguides and the plurality of optical fibers, and wherein one of the lenslet pairs of the first PIC and the second PIC are implemented over surfaces of the first PIC and second PIC.

9. The fiber-coupled phased-array of claim 8, wherein the lenslet pairs of the first PIC and the second PIC are coupled to waveguides of the first PIC and the second PIC via at least one of a 45-degree wedge coupler, a 45-degree coupler etched inside a substrate of the first PIC and the second PIC, a 3-D waveguide or a grating coupler.

10. A multi-photonic integrated circuit (PIC) interferometric phased array, the phased array comprising:
    a plurality of PICs placed at a distance from one another and coupled to one another using optical fibers; and
    an optical metrology system configured to measure optical delay errors induced by a relative placement of the plurality of PICs, wherein:
    a combination of the plurality of PICs comprises groups of lenslet pairs and corresponding coupling waveguides and form an interferometric imager,
    the interferometric imager is configured to sample spatial frequencies of a target with a high spatial-frequency resolution defined by a separation between a lenslet pair having a largest distance across the plurality of PICs.

11. The phased array of claim 10, wherein the optical metrology system is implemented in one of the plurality of PICs by using a laser source and at least one of the optical fibers.

12. The phased array of claim 10, wherein the optical metrology system is further configured to measure optical delay fluctuations induced by at least one of a movement or a vibration of an optical fiber of the optical fibers.

13. The phased array of claim 10, wherein at least one of the plurality of PICs includes an adjustable optical delay that is configured to compensate for the optical delay errors induced by a relative placement of the plurality of PICs.

14. The phased array of claim 13, wherein at least one of the plurality of PICs includes a heating element that is configured to assist with delay-error compensation.

15. The phased array of claim 10, wherein the interferometric imager employs lenslet pairs of the plurality of PICs coupled via waveguides and the optical fibers, and wherein the lenslet pairs of the plurality of PICs are implemented over surfaces of respective PICs of the plurality of PICs.

16. The phased array of claim 10, wherein the lenslet pairs of the plurality of PICs are coupled to waveguides of the plurality of PICs via at least one of a 45-degree wedge coupler, a 90-degree coupler etched inside a substrate of the plurality of PICs, a 3-D waveguide or a grating coupler.

17. The phased array of claim 10, wherein the plurality of PICs are combined in a hexagonal configuration.

18. A method of providing an interferometric phased array, the method comprising:
 coupling a plurality of PICs together by using optical fibers, the plurality of PICs being placed at a distance from one another;
 configuring an optical metrology system to measure optical delay errors induced by a relative placement of the plurality of PICs; and
 configuring an interferometric imager formed by a combination of the plurality of PICs to sample spatial frequencies of a target with a spatial-frequency resolution,
 wherein the spatial-frequency resolution is defined by a separation between a lenslet pair having a largest distance across the plurality of PICs.

19. The method of claim 18, wherein at least one of the plurality of PICs includes an adjustable optical delay and the method includes configuring the adjustable optical delay to compensate for the optical delay errors induced by the relative placement of the plurality of PICs.

20. The method of claim 19, wherein the interferometric imager employs lenslet pairs of the plurality of PICs coupled via waveguides and the optical fibers, and wherein the lenslet pairs of the plurality of PICs are implemented over surfaces of respective PICs of the plurality of PICs.

* * * * *